United States Patent [19]
Cross et al.

[11] 3,888,067
[45] June 10, 1975

[54] BANDING MACHINE

[75] Inventors: Radley Cross, Bala Cynwyd; John Laessig, Newtown Square, both of Pa.

[73] Assignee: Gilbreth Company, Cornwells Heights, Pa.

[22] Filed: Sept. 18, 1973

[21] Appl. No.: 398,514

[52] U.S. Cl. ................................. 53/292; 53/296
[51] Int. Cl. ................................................ B67b 5/00
[58] Field of Search ............ 53/291, 292, 295, 136, 53/139.3, 198 R, 198 A, 184, 296, 297, 307

[56] References Cited
UNITED STATES PATENTS

| | | | |
|---|---|---|---|
| 2,579,458 | 12/1951 | Allen et al. | 53/292 |
| 2,630,260 | 3/1953 | Tracy et al. | 53/292 |
| 2,680,549 | 6/1954 | Levy | 53/295 |
| 2,751,735 | 6/1956 | Bartlett et al. | 53/292 |
| 2,976,661 | 3/1961 | Bagnelle | 53/292 |
| 3,551,258 | 12/1970 | Galvanoni et al. | 53/291 X |
| 3,738,210 | 6/1973 | Fujio | 53/292 X |

*Primary Examiner*—Travis S. McGehee
*Assistant Examiner*—Horace M. Culver
*Attorney, Agent, or Firm*—Caesar, Rivise, Bernstein, & Cohen

[57] ABSTRACT

Apparatus for providing heat shrinkable bands onto bottles or other objects as they are fed through the apparatus on a conveyor belt. The apparatus comprises means for incrementally feeding a flat, hollow strip of heat shrinkable material from a storage reel. A vacuum head, including a pair of fingers, is provided to hold the end of the strip, whereupon cutting means cut off the length thereof to form a heat shrinkable band. The band is thereafter partially opened by the action of the vacuum fingers in gripping the outside surface of the band and is carried to a rotating mandrel. The band is placed on the mandrel to further open it and the mandrel is thereafter rotated to carry the band thereon to a dispensing station at which a vacuum ring is disposed. The vacuum ring grips the band by its outer surface to fully open the band and carries the fully opened band to the bottle, whereupon the band is placed thereon. The bottle with the band disposed on it is then moved, via the conveyor, through an associated heat tunnel, whereupon the band is tightly shrunk in place.

9 Claims, 7 Drawing Figures

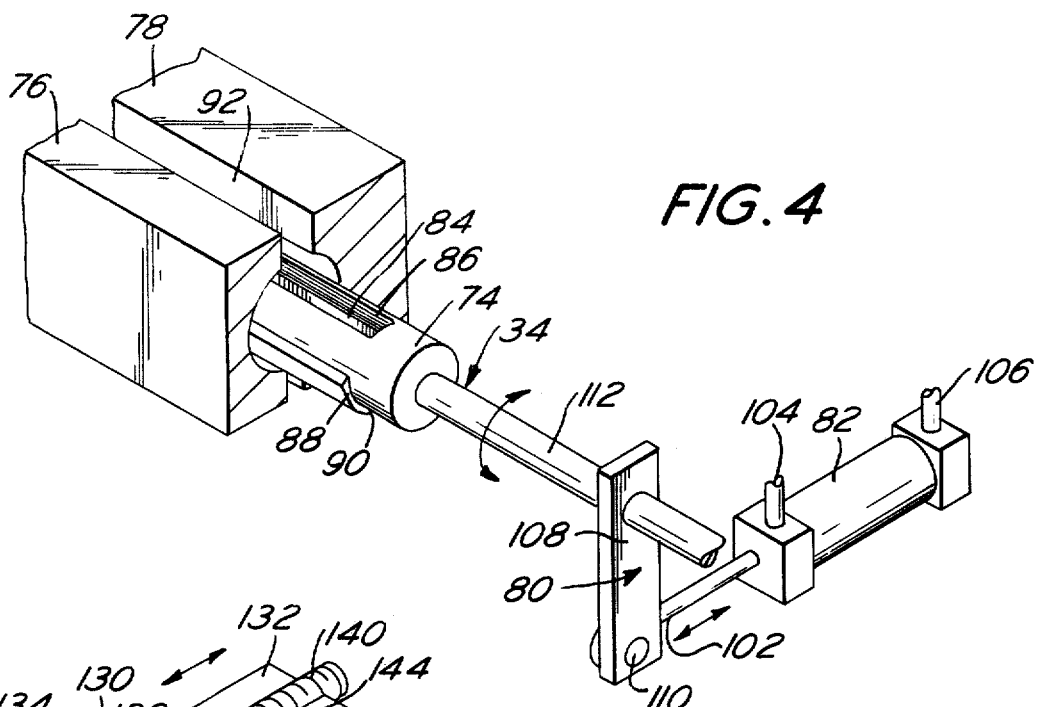
FIG. 4
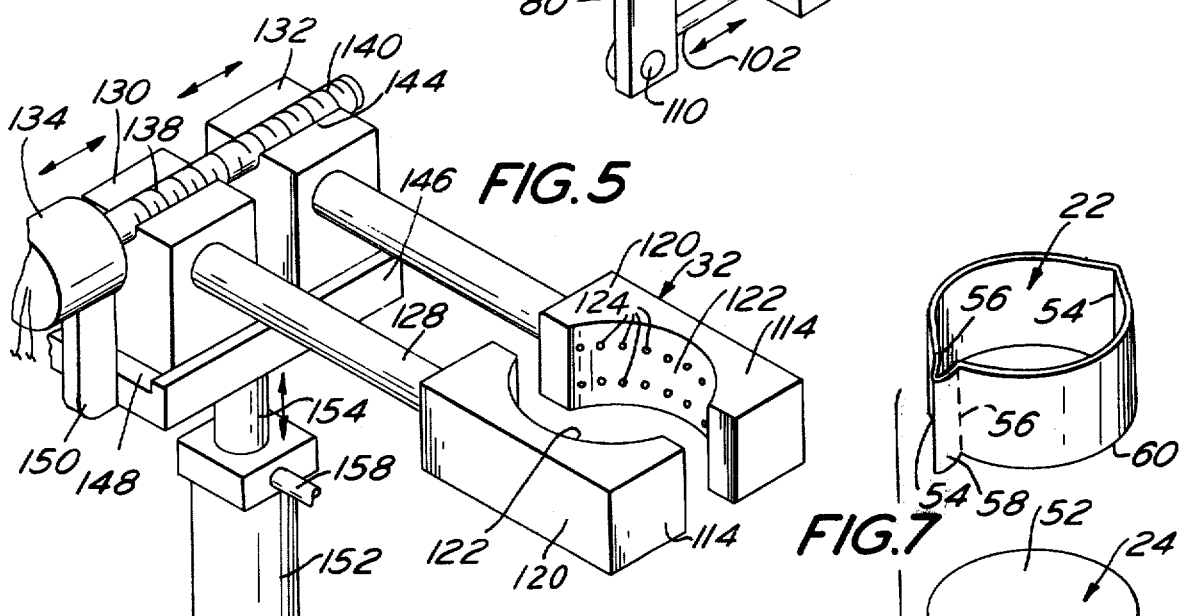
FIG. 5
FIG. 7
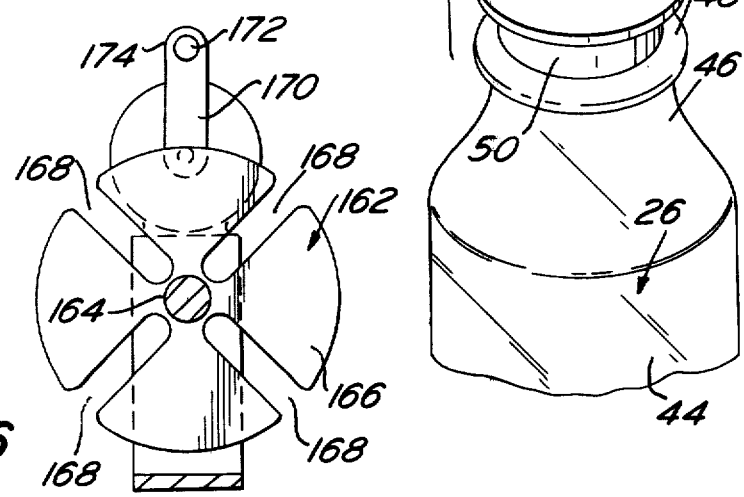
FIG. 6

BANDING MACHINE

This invention relates to banding apparatus and more particularly to apparatus for providing heat shrinkable bands on articles.

It is becoming a common practice to seal the closures of bottles or other like containers by the use of heat shrinkable bands disposed about the containers at their closure. Heat shrinkable bands are also used to provide labelling or decorations on bottles and other such vessels.

Various apparatus are known in the art for applying such bands to bottles and the like, but none have met with complete commercial success for a number of reasons, namely, complexity, speed, accuracy, reliability and adaptability. For example, some prior art apparatus use internal mandrels to carry slightly open creased bands to the bottle to slide the band directly onto the bottle. Such apparatus are severely limited in the distance that the band can be transported to the bottle, particularly if narrow width bands are used.

Other apparatus utilize plungers, sliding actions or special and complex drives to place the bands on the bottles. Furthermore, such apparatus require the use of oversized bands to ensure correct placement.

Still other banding apparatus depend on the bottle itself being raised or otherwise moved into an opened band held by some mechanism.

Accordingly, it is a general object of this invention to provide a banding apparatus which overcomes the disadvantages of the prior art.

Another object of this invention is to provide apparatus for accurately and reliably applying heat shrinkable plastic bands to bottles at a high rate of speed.

It is yet another object of this invention to provide apparatus which can be readily adapted to provide various size heat shrinkable bands on bottles.

These and other objects of this invention are achieved by providing apparatus for putting a band around an article. The apparatus comprises means for supplying the band to first vacuum means which grip the outer surface of the band. The first vacuum means moves the band onto a mandrel means which serves to transport the band. Second vacuum means are also provided, with the mandrel serving to move the band disposed on it to the second vacuum means. The second vacuum means grips the outer surface of the band to move it to a position around the article.

Other objects and many of the attendant advantages of this invention will become readily appreciated as the same becomes better understood by reference to the following detailed description when considered in connection with the accompanying drawings wherein:

FIG. 4 is an enlarged perspective view of a portion of the apparatus shown in FIG. 1;

FIG. 5 is an enlarged perspective view of a portion of the apparatus shown in FIG. 1;

FIG. 6 is an enlarged sectional view taken along line 6—6 of FIG. 3; and

FIG. 7 is an enlarged exploded perspective view of a bottle and band utilized in the apparatus shown in FIG. 1.

Figure 1:
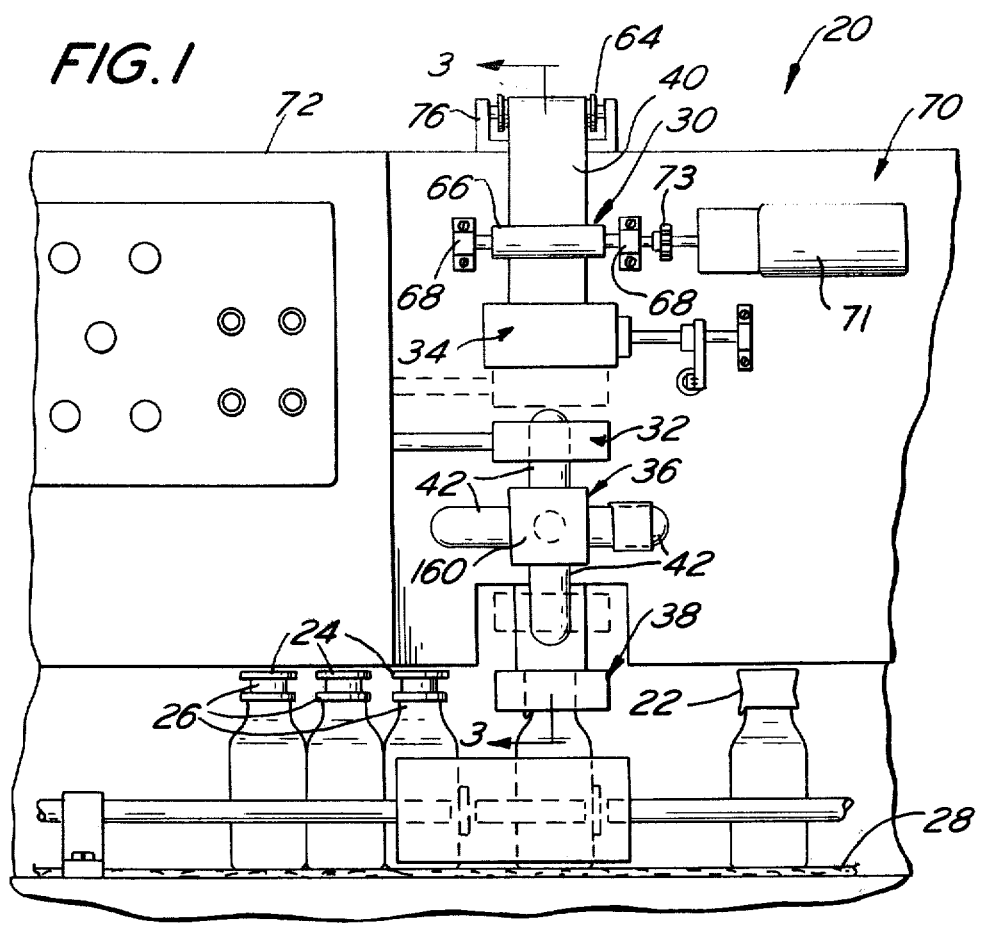
FIG. 1 is a side elevational view of a portion of the apparatus in accordance with this invention.

Referring now to the various figures of the drawing wherein like reference characters refer to like parts, there is shown in FIG. 1 an improved banding apparatus or machine 20. Machine 20 is arranged to provide heat shrinkable bands 22 about the cap or closure 24 of bottles 26 as the bottles are carried past the apparatus at a relatively high rate of speed on a conveyor 28. Machine 20 basically comprises material feed means 30, a first vacuum transportation assembly 32, a cutting device 34, a rotating mandrel assembly 36 and a second vacuum transportation assembly 38.

The material feed means 30 is arranged to incrementally feed a flat, hollow strip of heat shrinkable plastic material from a storage reel 31 (FIG. 2) to the first vacuum transportation assembly 32. The assembly 32 serves to grip and hold the end of the strip 40 in position while the cutting device 34 cuts off a length from the end of the strip to produce the band 22. The assembly 32 also serves to grip and pull outwardly on the outside surface of the flat band produced by the cutting means to open the band partially.

The assembly 32 is movable from a position adjacent the cutting device 34 to a position immediately adjacent the mandrel assembly 36 to carry the band from the former to the latter, whereupon the band is placed on one mandrel 42 of the assembly 36. The mandrel 42 serves to further open the band and to hold it in that state. The assembly 36 is arranged to be rotated incrementally to carry the more fully opened band 22 to a location immediately adjacent the second vacuum transportation 38.

The second vacuum transportation assembly 38 serves to grip the outside surface of the band which is disposed on the mandrel 42 to remove the band therefrom, while completing the opening of the band. Furthermore, the transportation assembly 38 is movable from a position adjacent the mandrel assembly to a position adjacent the conveyor 28 to withdraw the fully opened band from the former and carry the same to a bottle 26 disposed on the latter, whereupon the assembly 38 slides the band over the closure 24 of the bottle.

The bottle with the band thereon moves down the conveyor to a heat shrinkable tunnel (not shown) wherein the band is shrunk to effect the tight securement of the closure 24 on the bottle 26.

The heat shrink tunnel is preferably constructed and arranged in accordance with the teachings in copending U.S. Pat. application Ser. No. 341,412, which is assigned to the same assignee of this invention and whose disclosure is incorporated by reference herein.

Turning now to FIG. 7, there is shown in an exploded perspective view a bottle 26 having a closure or cap 24 and about which a heat shrinkable band 22 is to be disposed. As can be seen, the bottle includes a large diameter body 44 terminating in a reduced diameter neck 46 including a peripheral flange 48. The cap 24 includes a cylindrical body portion 50 disposed in the opening in the neck 46 of the bottle and a top portion 52 adapted to be gripped in one's hand to remove the cap from the bottle.

The band 22 is of generally cylindrical shape and includes a pair of crease lines 54 diametrically opposed from one another. The lines 54 result from the fact that the band is produced from a flat, hollow strip of heat shrinkable plastic.

The band also includes a pair of perforated lines 56 disposed closely adjacent to one another on opposite sides of one crease line. A rounded tab 58 extends from the bottom edge 60 of the band between the perforated lines 56. The tab is formed when the band is cut from the strip of plastic.

The band 22 is arranged to be placed around the neck of the bottle and its component cap and is shrunk in place to securely hold the cap in place.

The tab 58 is provided to effect the removal of the shrunk band from the bottle when it is desired to do so. To that end, the tab may be gripped between the fingers of the user's hand and pulled upwardly to cause the band to tear along the perforated lines 56, thereby removing the band from the bottle.

As should be appreciated by those skilled in the art, the bottle 26 and its associated cap 24 represents a typical glass bottle in which vitamins or other medicines are commonly vended. However, it should be noted that the apparatus 20 of this invention is capable of providing bands on various other types of bottles and, in fact, is capable of providing bands on various objects other than bottles such as cans, boxes, toys, etc. Furthermore, the apparatus 20 is capable of accommodating bands of different shapes than shown in the drawing and such bands may include printing or other decoration thereon so as to provide a labelling or ornamental function.

Figure 2:
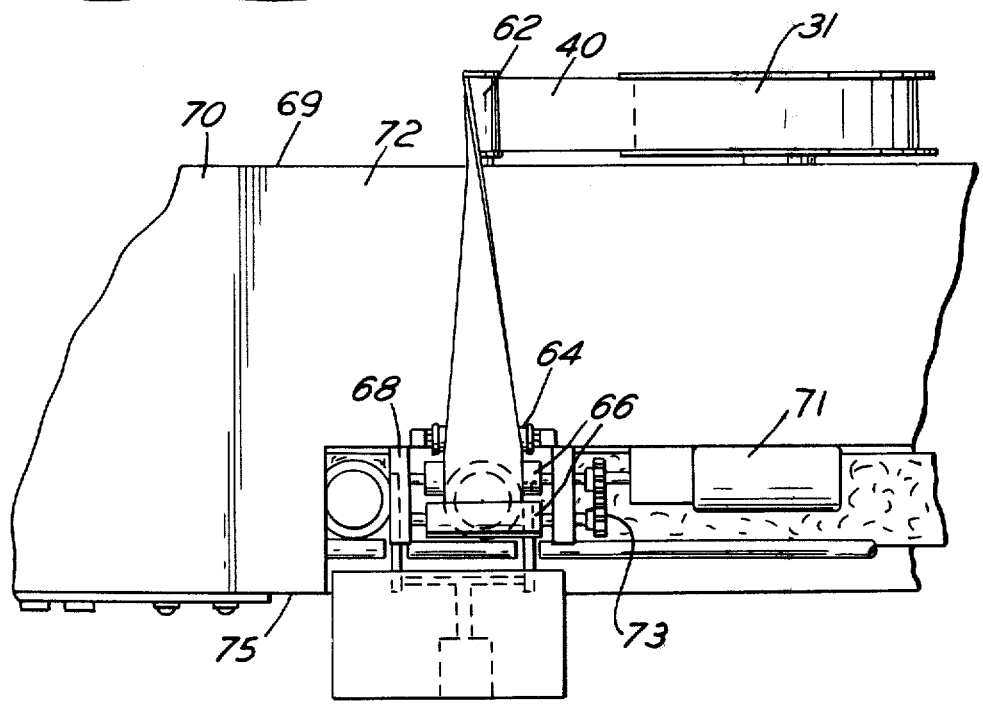
FIG. 2 is a top elevational view of the portion of the apparatus shown in FIG. 1.
Figure 3:
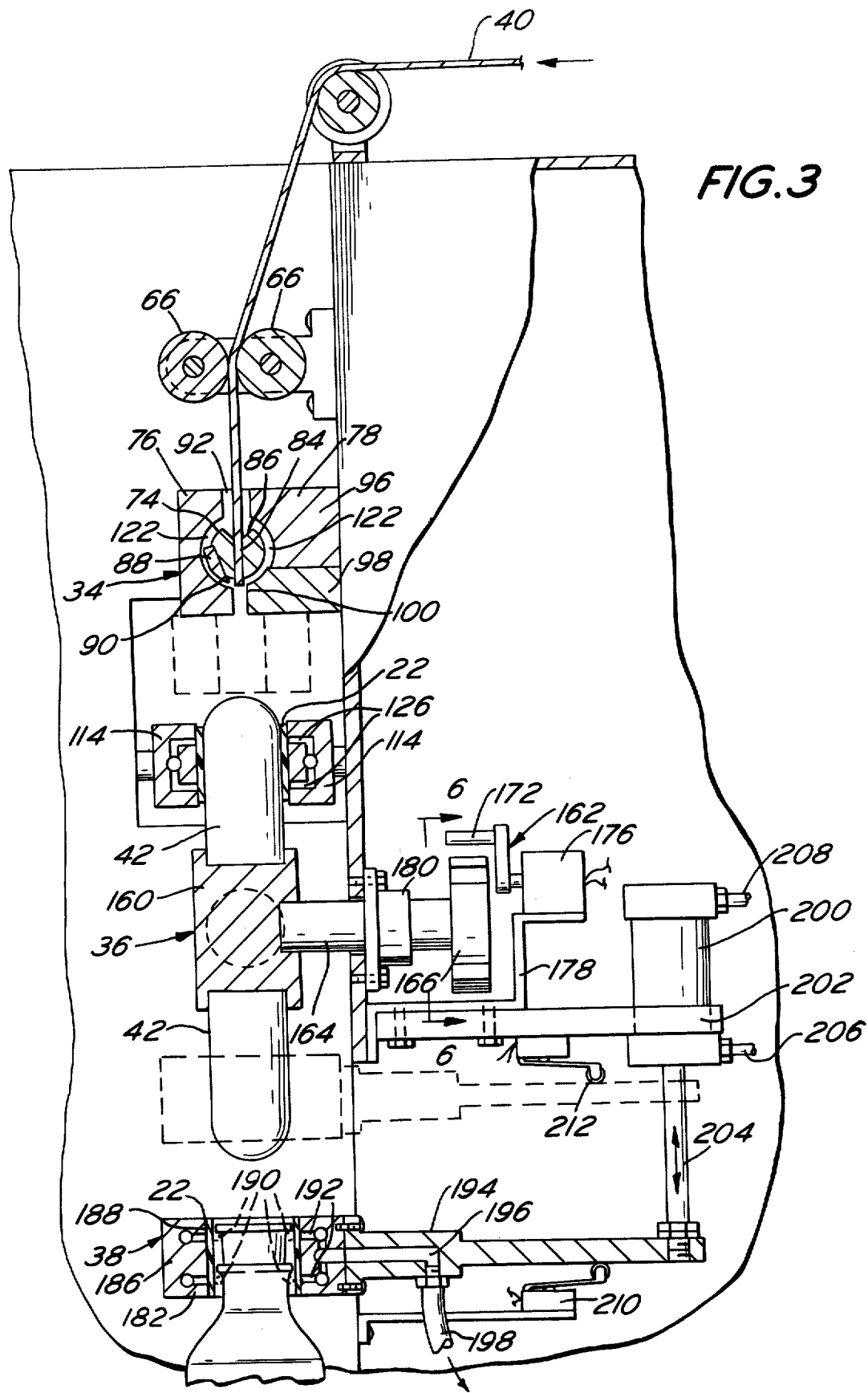
FIG. 3 is an enlarged sectional view taken along line 3—3 of FIG. 1.

As can be seen in FIGS. 1, 2 and 3, the material feed means 30 basically comprises a storage reel 31, upon which a hollow, flat strip 40 of heat shrinkable tubing is wound, an idler or guide roller 62, an idler or guide roller 64 and a pair of drive rollers 66.

The storage reel 31 is mounted for rotation on the back 69 of the housing 70 of the apparatus 20 and is adjacent to the top 72 thereof.

The strip 40 is withdrawn from the reel 31 in a direction parallel to the back of the apparatus and extends under the guide roller 62. The guide roller 62 is mounted on the back of the housing adjacent its top with the axis of rotation of the roller parallel to the axis of rotation of the reel 31. The roller serves to change the direction of the strip to direct it across the top of the housing to the guide roller 64 which is mounted at the top of the housing adjacent the front 75 thereof, with the axis of rotation of the roller 64 normal to that of roller 64. The roller 64 is held in position by a mounting bracket 76 (FIG. 1) connected to the top 72 of the housing. The roller 64 serves to guide the strip 40 from the top of the apparatus downward along its face 75 to the pair of drive rollers 66 which are mounted thereon.

Drive rollers 66 are mounted in the support bracket 68 with their axes of rotation parallel to one another. The rollers are arranged to contact opposite sides of the strip 40 passing therebetween, with the rollers being driven in opposite rotational directions by a motor 71 acting through an associated gear assembly 73. This action effects the drawing of the strip through the rollers from the storage reel 31. The drawn strip is fed by the drive rollers directly to the cutting device 34 at which a length of the strip is cut off to form the band 22.

As can be seen in FIGS. 3 and 4, the cutting device basically comprises a slotted cutting head 74 mounted within a pair of opposed blocks 76 and 78 and connected, via drive means 80, to a fluid pressure operated cylinder 82. The cutting head 74 is an elongated cylindrical member having a longitudinal slot 84 extending therethrough. The slot is dimensioned such that the strip 40 is enabled to freely pass therethrough and includes a flared mouth 86 (FIG. 3) at one side thereof to facilitate the insertion of the end of the strip 40 therein. A longitudinal cutting blade 88 is mounted on the head 74 and includes a straight cutting edge 90 extending outward from the periphery of the head and along the unflared end of the slot 84 (see FIG. 3).

The blocks 76 and 78 are disposed opposite one another with a narrow space 92 therebetween. Each block includes a semi-circular recess 94 in its inside face, which recesses, together, define a circular space therebetween and into which the cutting head 74 is disposed with a small clearance between the recess wall and the cutting head. The block 76 is unitary, whereas the block 78 comprises two portions, 96 and 98, the lower portion, 98, being formed of hard steel. The line at which the recess 94 meets the side face of lower portion 98 is denoted by the reference numeral 100 and serves as a stationary cutting edge against which the movable cutting edge 90 works to sever the band 22 from the strip 40. To that end, the cutting head 74 is arranged to rotate about its longitudinal axis and within the blocks 76 and 78 under the influence of a force generated by the cylinder 82. Upon the rotation of the cutting head 74, the strip 40 is moved laterally and into contact with the stationary cutting edge 100 and is thus prevented from further movement thereby, while the continued rotation of the cutting head 74 causes the cutting edge 90 to slice through the stationary strip, thereby severing a band 22 from the end thereof.

As can be seen, the fluid pressure operated cylinder 82 includes a drive shaft 102 connected thereto. The drive shaft is adapted to reciprocate inwardly and outwardly of the cylinder depending upon the pressurization thereof. For example, the pressurization of the cylinder from a fluid source (not shown) via input line 104 causes the drive shaft 102 to be extended out of the cylinder, whereas the pressurization of line 106 from the source causes the drive shaft to be retracted toward the cylinder. The free end of the shaft 102 is pivotably connected to the lower end of a rocking link 108 via a pin 110. The upper end of the link 108 is fixedly connected to a shaft 112 which is in turn coaxially connected to the cutting head 74. Upon the pressurization of line 106, the cylinder 82 retracts the shaft 102, whereupon the link 110 and the cutting head connected thereto is rotated counterclockwise to effect the cutting action as above described. The pressurization of line 108 causes the cylinder 82 to retract shaft 112 and thereby causes the cutting head to be rotated counterclockwise and back to the position shown in FIG. 3, whereupon the slot 84 in the cutting head is aligned with the passageway between the blocks 76 and 78 to enable a predetermined length of strip 40 to be fed therethrough under the influence of the drive roller 66. Means (not shown) are utilized to control the length of time that the drive roller 66 operates before the cutting device operates.

The vacuum transportation assembly 32 is adapted to hold the lower end of the strip 40 in place during the cutting operation and thereafter to carry the band produced by the cutting operation to the rotating mandrel assembly 36. Furthermore, the assembly 32 serves to partially open the band 22 as it grips it.

As can be seen in FIG. 5, the vacuum assembly 32 basically comprises a pair of separatable vacuum fingers 114, means 116 for separating and closing the fingers 114 and means 118 for moving the fingers 114 between a position immediately adjacent the cutting device 32 and a position immediately adjacent the mandrel assembly 36.

Each vacuum finger 114 comprises a block 120 having a semi-circular recess 122 in its inside face. A plurality of small apertures 124 are provided in a semi-circular surface of each recess and the apertures extend into and are in communication with vacuum passageways 126 (FIG. 3) within the block.

Each of the fingers 114 is mounted on one end of a support rod 128. The other end of one rod 128 is rigidly connected to a mounting block 130 and the other end of the other rod 128 is rigidly connected to mounting block 132. The rods 128 each include an internal passageway (not shown) in communication with the vacuum passageways 126 in the associated finger and with a passageway (not shown) in the associated mounting block. The interal passageways in the mounting blocks are coupled to a source of vacuum (not shown) which, via the communicating passageways, is effective to create a partial vacuum at the surface of each of the semi-circular recesses 122.

The vacuum fingers 114 are closed and opened to effect the gripping and the subsequent release of the band 22 by an electrical motor 134 acting through a drive screw 136. The drive screw is an elongated member having two sets of threads 138 and 140 thereon, one set being cut in a clockwise direction and the other set being cut in a counterclockwise direction. The screw is disposed within axially aligned threaded grooves 142 and 144 in the mounting blocks 130 and 132, respectively, with the threads in the screw mating with the threads in the associated grooves. The screw is connected to the motor and is adapted to be rotated either counterclockwise or clockwise by the motor under the control of means (not shown). The mounting blocks 130 and 132 are disposed in a longitudinal channel 146 of an elongated track 148. The motor 134 is stationarily mounted to the side of the track by a bracket 150.

As should be appreciated by those skilled in the art, upon the rotation of the drive screw in one rotational direction, the blocks 130 and 132 move toward one another by sliding in the groove 148, and upon the rotation of the screw in the opposite direction the blocks move away from one another.

The vacuum fingers 114 are moved between the position adjacent the cutting device and the position adjacent the rotating mandrel to effect the transfer of the band 22 from the former to the latter and the subsequent return of the empty fingers to the former, by a fluid pressure operated cylinder 152. The cylinder 152 is mounted on the housing of the apparatus in a vertical orientation and includes an upwardly projecting shaft 154 having its free end connected to the bottom of the track 146. When the cylinder 152 is pressurized by means (not shown), via input line 156, the shaft 154 extends away from the cylinder and when the cylinder is pressurized, via input line 158, the shaft retracts toward the cylinder. Accordingly, the pressurization of the cylinder, via line 156, causes the cylinder to raise the vacuum fingers 114 to a position immediately adjacent the cutting device 34 and the pressurization of the cylinder, via line 158, causes the cylinder to lower the vacuum fingers to a position immediately adjacent the rotating mandrel 36.

As can be seen in FIG. 1, the mandrel assembly 36 comprises a square central hub 160 including four faces from which four mandrels 42, respectively, extend. The mandrels 42 are in the form of elongated cylinders whose diameter is slightly smaller than the fully opened diameter of the band 22. The free end of each of the mandrels is rounded or domed to facilitate the insertion of a band thereon. The diameter of the mandrels 42 is dimensioned to open the band 22 more fully than the vacuum fingers 114 of assembly 32, but not to completely open it.

Means are provided within the apparatus housing to rotate the mandrel assembly 36 to move an empty mandrel 42 into position to receive a partially opened band from the first vacuum assembly 32.

As shown in FIGS. 3 and 6, the means for rotating the mandrel assembly 36 comprises a conventional Geneva drive 162 and a drive shaft 164. The drive shaft is connected between the Geneva drive and the hub 160 of the mandrel assembly. The Geneval drive 162 basically comprises a drive cam 166 to which the drive shaft 164 is connected and includes four slots 168 therein and an elongated link 170 having a follower 172 at its free end 174. The other end of the link 170 is connected to the power shaft of an electrical motor 176. The motor is mounted on a support brackedt 178 within the housing. The shaft 164 extends through a bearing assembly 180 in the front of the housing and is supported therein.

The drive 162 operates as follows: The rotation of motor 174 causes the link 170 to rotate, thereby causing the follower 172 to move into slot 168 in the cam 164. Upon entering the slot, the follower slides down the slot and upon reaching the bottom thereof slides up. This action causes the cam crank 170 to rotate through an angle of 90°, and thus the connected mandrel assembly also rotates through that angle. The continued rotation of the crank under the influence of the electrical motor causes the follower to move out of the slot 168 and to move over the periphery of the cam to thereafter enter the next succeeding slot 168 therein. During the internal of time that the follower is not moving in a slot 168 in the cam 166, the cam does not rotate. Accordingly, the drive causes the intermittent rotation of the mandrel assembly 36.

The vacuum transportation assembly 38 is adapted to grip the outside surface of the band 22 held on a mandrel, to remove it from the mandrel and carry it to a position adjacent the conveyor 28 to slide the band over the neck of a bottle disposed on the conveyor. Furthermore, the assembly 38 serves to completely open the band and thereby facilitates the insertion of the band around the neck of the bottle.

The vacuum transportation assembly 38 basically comprises a vacuum ring 182 (FIGS. 1 and 3) and means for moving the ring between a position immediately adjacent the mandrel assembly 36 and a position immediately adjacent the conveyor 28.

The vacuum ring 182 comprises a block 186 having a circular central opening 188. The diameter of the opening is slightly larger than the diameter of a mandrel with a band thereon. A plurality of small apertures 190 are provided in the circular surface of the opening 188 and the apertures extend into the block 186 and are in communication with vacuum passageways 192 therein. The ring 182 is bolted onto a support 194. The support 194 includes a passageway 196 which communicates with the passageway 192 in the vacuum ring 182. A hose 198 is connected at one end thereof to an outlet port 200 of the passageway 196. The other end of the hose is connected to a vacuum source (not shown). The vacuum source is effective, via the communicating passageways, to create a partial vacuum of the circular surface of the opening 188.

The vacuum ring 182 is moved between the position immediately adjacent the rotating mandrel assembly 36 (as shown by the dotted lines in FIG. 3) and the position immediately adjacent the bottle on the conveyor, to effect the transfer of the band from the former to the latter and the subsequent return of the empty vacuum ring to the former, via a fluid pressure operated cylinder 200. The cylinder 200 is mounted on a bracket 202 within the housing in a vertical orientation. A downwardly extending shaft 204 including a threaded free end which is connected to the support 194 is connected to the cylinder 200.

When the cylinder 200 is pressurized from means (not shown), via one input line 206, the shaft 204 extends downward and away from the cylinder and when the cylinder is pressurized, via the other input line 208, the shaft retracts upward toward the cylinder. Accordingly, the pressurization of the cylinder via line 206, causes the cylinder to raise the vacuum ring 182 to the dotted line position shown in FIG. 3 at which the ring is effective to remove a band from the mandrel. The pressurization of the cylinder, via line 208, causes the cylinder to lower the vacuum ring to the sold line position shown in FIG. 3 at which the ring is effective to provide the band about the neck of a bottle on the conveyor 28.

A pair of electrical switches 210 and 212 are mounted in the housing and are coupled to means (not shown) which effects the control of the vacuum source.

Operation of the apparatus 20 is as follows: The drive roller 66 draws a flat strip of material from reel 31 over guide rollers 62 and 64. The material is drawn through the space 92 between the blocks of the cutting device and into the flared opening 86 in the slot 84 of the rotating cutting head. The strip is drawn through the cutting device and extends for a predetermined distance therebelow.

The vacuum transportation device 32 is moved upward under the influence of fluid pressure cylinder 152 being pressurized, via line 156, from a pressure source. This results in the positioning of the fingers 114 of the transportation assembly 32 immediately below the cutting device 32, with the portion of the strip 40 extending within the space defined between the semi-circular recesses 22 in the fingers. When the fingers are positioned thusly, the vacuum source is actuated to result in the creation of a partial vacuum at the surface of the recess 122 of each other. This action has the effect of partially opening the heretofore flat band. The cylinder 82 is then positioned via line 106 to cause the cutting head to rotate, whereupon its cutting edge 90 slices through the strip 40 and against the stationary cutting edge 100 to produce band 22.

Once the band is gripped by the vacuum fingers 114, the fluid pressure cylinder 152 is pressurized via line 158 to result in the lowering of the spring fingers 114 from the dotted line position shown in FIG. 3. The lowering of the spring finger results in the placing of the band about mandrel 42 which is axially aligned therewith. The mandrel 42 serves to more fully open the band, although not completely opening it.

Upon the positioning of the band on the mandrel, as described immediately above, the partial vacuum ceases under the influence of means (not shown) controlling the vacuum source and at the same time, the fluid pressure cylinder 152 is pressurized, via line 156, to result in the upward movement of the vacuum fingers 114, thereby leaving the band 22 in place on the mandrel 42.

At the time that the spring fingers 114 clear the domed end of the mandrel 42 after having disposed the band 22 thereon, the follower 172 of the Geneva drive 162 enters a slot 168 of the cam 166 and thereby initiates the rotation of the drive shaft 164 and the mandrel assembly connected thereto. The continued rotation of the electrical motor 176 results in the rotation of the mandrel assembly through an arc of 90°. This action results in an empty mandrel being positioned to extend upward and towards the now retracted vacuum transportation assembly 32 to enable that mandrel to be provided with a band in the same manner as previously described.

The continued intermittent rotation of the mandrel assembly as described above causes a previously filled mandrel, that is a mandrel having a band disposed thereon, to extend downward and toward the vacuum ring 182. At the occurrence of a filled mandrel extending downward, the fluid pressure cylinder 200 is pressurized, via line 206, to result in the upward movement of the vacuum ring 182 to the dotted line position shown in FIG. 3, wherein the ring extends about the band disposed on the downwardly extending mandrel 42. When the vacuum ring 182 has reached the dotted line position shown in FIG. 3, the support 194 makes contact with switch 212. This action causes the activation of the vacuum source to result in the creation of a partial vacuum at the inside surface of the ring 182, via the communicating passageways 192, 196 and 198. The partial vacuum has the effect of gripping the outside surface of the band to completely open it and move it away from the peripheral surface of the mandrel 42.

The fluid pressure cylinder 200 is then pressurized, via line 208, to result in the extension of shaft 204 and hence the downward displacement of the vacuum ring 182 and the band 22 carried thereby, whereupon the opening 188 in the ring slides down over the mouth of a bottle 26 passing along on the conveyor 28.

Once the vacuum ring 182 is in the position shown in FIG. 3, the support 194 makes contact with switch 210 to result in the deactivation of the vacuum source. This action causes the partial vacuum to terminate and thereby effects the release of the band from about the mouth of the bottle. Upon the release of the band, the fluid pressure cylinder 200 is again pressurized, via line 206, to result in the retraction of shaft 204 and thus the movement of ring 182 upward, thereby leaving the loose band on the bottle. The bottle is carried by the conveyor to the heat shrink tunnel wherein the band is shrunk tightly about its neck to hold its closure tightly in place.

The above described banding operation occurs each time that the mandrel assembly is rotated through a 90° arc, with a band being applied to the mandrel assembly by the vacuum fingers 114 as a band is removed from the mandrel and placed about a bottle by the vacuum ring 182.

As will be appreciated by those skilled in the art, the banding machine of the instant invention has several advantageous features. For example, due to the fact that the band is opened in stages, i.e., partially opened by the first vacuum transportation assembly, then more fully opened by the mandrel and finally completely opened by the second vacuum transportation means, the amount of work done at each stage is low, thereby increasing the reliability of the system.

Furthermore, since the second vacuum transportation means opens the band to the fullest extent possible and holds it open from the outer surface by the band, an extremely close fit can be effected between the unshrunk band and the bottle upon which it is placed. This feature is of considerable importance in that percentage shrinkage of the band is inherently limited, therefore objects having a larger ratio of large-to-small girth can be accommodated. Also, a close fit between the unshrunk band and the bottle reduces the distortion of any printed matter on the band.

Further still, by virtue of the fact that the band is carried by its outer surface to the bottle, in contradistinction to prior art techniques wherein the band is carried by its inside surface, the distance that the band is carried to the bottle can be greater than the length of the band without the band falling off its holder or otherwise becoming misaligned. Accordingly, various length bands can be utilized in the apparatus of this invention. In fact, as should be appreciated by those skilled in the art, bands of various diameters can be used by the mere expedient of changing the size of the mandrels and if necessary the vacuum transportation assemblies.

Without further elaboration, the foregoing will so fully illustrate our invention that others may, by applying current or future knowledge, readily adapt the same for use under various conditions of service.

What is claimed as the invention is:

1. Apparatus for providing a band about an article moving along a horizontal path comprising means for supplying a band of a predetermined length, first vacuum means to grip the outer surface of the band to effect the partial opening of the band and to carry said partially opened band along a vertical path to mandrel means disposed therebelow, said mandrel means including a turret having a plurality of mandrels extending radially outward therefrom, said turret being rotatable about a horizontal axis to rotate said mandrels in a vertical plane whereupon one of said mandrels extends vertically upward towards said first vacuum means and one of said mandrels extends vertically downward towards second vacuum means disposed therebelow, each of said mandrels being cylindrical and including a tapered end, the diameter of said mandrels being slightly smaller than the inside diameter of the band when fully opened such that when said first vacuum means places said partially opened band on said mandrel said mandrel effects the more full opening of said band, said second vacuum means for gripping the outer surface of the band disposed on said downwardly extending mandrel to substantially fully open the band and completely remove it from said mandrel by thereafter carrying said band in a downward vertical direction off said mandrel to position it around said article disposed therebelow.

2. The apparatus of claim 1 wherein the means for supplying the band supplies it in the form of a flat, hollow strip and wherein cutting means are provided for cutting off said band from said strip prior to the operation of said first vacuum means.

3. The apparatus of claim 2 wherein the means for supplying the band comprises storage means for storing a flat, hollow strip on a reel and incremental feed means for incrementally feeding the strip to said cutting means.

4. The apparatus of claim 3 wherein the first vacuum means holds the end of the strip as the cutting means cuts off a length from the end thereof.

5. The apparatus of claim 3 wherein the first vacuum means comprises plural vacuum fingers.

6. The apparatus of claim 5 wherein each of the fingers includes a concave portion having a plurality of apertures therein and adapted to grip the outer surface of the band.

7. The apparatus of claim 6 wherein said fingers are arranged to open and close.

8. The apparatus of claim 6 wherein the second vacuum means comprises a vacuum ring.

9. The apparatus of claim 8 wherein the vacuum ring includes a circular peripheral inside surface having a plurality of vacuum apertures and adapted to grip the outer surface of the band to fully open the band.

* * * * *